(12) United States Patent
Ying et al.

(10) Patent No.: US 10,472,703 B2
(45) Date of Patent: Nov. 12, 2019

(54) METAL ALLOY FOR COIN PRODUCTION

(71) Applicant: The United States Mint, Washington, DC (US)

(72) Inventors: Tsineng T. Ying, Silver Spring, MD (US); Richard R. Robidoux, Kennett Square, PA (US); Uvon Tolbert, Stafford, VA (US)

(73) Assignee: The United States Mint, Washington, DC (US)

( * ) Notice: Subject to any disclaimer, the term of this patent is extended or adjusted under 35 U.S.C. 154(b) by 93 days.

(21) Appl. No.: 15/943,003

(22) Filed: Apr. 2, 2018

(65) Prior Publication Data

US 2019/0106772 A1 Apr. 11, 2019

Related U.S. Application Data

(60) Provisional application No. 62/568,882, filed on Oct. 6, 2017.

(51) Int. Cl.
*B23K 20/00* (2006.01)
*C22C 38/16* (2006.01)
(Continued)

(52) U.S. Cl.
CPC ............. *C22C 38/16* (2013.01); *A44C 21/00* (2013.01); *B23K 20/02* (2013.01); *B23K 20/227* (2013.01); *B32B 15/015* (2013.01); *B32B 15/18* (2013.01); *B32B 15/20* (2013.01); *C22C 38/04* (2013.01); *C22C 38/08* (2013.01); *B23K 2103/04* (2018.08); *B23K 2103/22* (2018.08); *C21D 1/26* (2013.01); *C21D 9/0068* (2013.01)

(58) Field of Classification Search
CPC ......... C22C 38/16; C22C 38/04; C22C 38/08; B32B 15/015; B32B 15/20; B32B 15/18; A44C 21/00; C21D 1/26; C21D 9/0068
See application file for complete search history.

(56) References Cited

U.S. PATENT DOCUMENTS 3,750,253 A * 8/1973 Miller .................... A44C 21/00
428/637
4,292,377 A * 9/1981 Petersen ................ A44C 21/00
428/675
(Continued)

FOREIGN PATENT DOCUMENTS

CN 101608286 A * 12/2009
JP 55089431 A * 7/1980 ........... C21D 8/0205
(Continued)

*Primary Examiner* — Kiley S Stoner
(74) *Attorney, Agent, or Firm* — John D. Fado; Robert D. Jones

(57) ABSTRACT

The metal alloy is a possible replacement for/alternative to cupronickel cladding material used on currently-circulating clad coins. In the preferred embodiment, the (steel) metal alloy cladding material comprises 73-77% iron, 22-26% nickel, 0.2-0.5% carbon, and 1-5% manganese. The cladding material has an International Annealed Copper Standard (IACS) conductivity of less than 2%, a permeability of approximately 1.0-1.1, and a hardness value of 50-70 HRC 15 T (Rockwell Hardness). In alternative embodiments, the steel alloy comprises a monolithic coin or a core that may be plated with other metals.

19 Claims, 15 Drawing Sheets
(15 of 15 Drawing Sheet(s) Filed in Color)

(51) Int. Cl.
*C22C 38/08* (2006.01)
*C22C 38/04* (2006.01)
*B32B 15/01* (2006.01)
*B32B 15/20* (2006.01)
*A44C 21/00* (2006.01)
*B32B 15/18* (2006.01)
*B23K 20/227* (2006.01)
*B23K 20/02* (2006.01)
C21D 9/00 (2006.01)
C21D 1/26 (2006.01)
B23K 103/22 (2006.01)
B23K 103/04 (2006.01)

(56) References Cited

U.S. PATENT DOCUMENTS

| | | | | |
|---|---|---|---|---|
| 5,614,149 A | * | 3/1997 | Abe | C21D 8/0205 420/43 |
| 2015/0321288 A1 | * | 11/2015 | Borek | B23K 35/3033 148/525 |
| 2015/0336218 A1 | * | 11/2015 | Borek | B23K 35/3033 427/597 |
| 2017/0355044 A1 | * | 12/2017 | Mukai | B23K 9/173 |
| 2019/0219218 A1 | * | 7/2019 | Ide | B21C 37/08 |

FOREIGN PATENT DOCUMENTS

| | | | | | |
|---|---|---|---|---|---|
| JP | 04066651 A | * | 3/1992 | | |
| JP | 07070714 A | * | 3/1995 | ........... | C21D 8/0205 |
| JP | 2005213589 A | * | 8/2005 | | |
| JP | 2007197807 A | * | 8/2007 | | |
| WO | WO-9502075 A1 | * | 1/1995 | ........... | C21D 8/0205 |

\* cited by examiner

METAL ALLOY FOR COIN PRODUCTION

REFERENCE TO RELATED APPLICATIONS

This application claims the benefit of U.S. Provisional Application No. 62/568,882, filed Oct. 6, 2017, which is incorporated herein by reference in its entirety.

FIELD OF THE INVENTION

The disclosed alloy comprises a cladding material for making coins. Specifically, the disclosed steel alloy comprises a coinage material that is suitable for use as an alternative cladding for currently-circulating US coins.

BACKGROUND OF THE INVENTION

Over time, the value of some coin materials have increased to be worth more than the face value of the coins. Steel is an attractive alternative material for replacing some current coin alloys—primarily because of steel's low cost and excellent durability. The current price of steel is only about 1/10 to 1/15 of the price of copper. However, steel has a high permeability (i.e. degree of magnetism) and other problematic electrical and surface-hardness properties. Specifically, steel's lag phase angle is completely different from non-ferromagnetic materials. Consequently, existing coin validators will not recognize (for example) a steel quarter—even though the steel quarter may have the same dimensions and stamping as currently-circulating quarters.

However, some steel alloys are non-ferromagnetic and have significantly different properties than common steel. To use most steels, stamping tonnage must be increased by more than 20% (relative to copper or cupronickel) to achieve a clean stamping relief result. To be usable, a steel coin must have low strain hardening properties (i.e. be sufficiently soft) for effective stamping, and have a relative permeability that is close to 1.0. A relatively high nickel-steel coin can meet these criteria. If steel containing 18% nickel and 0.60% carbon is quenched in water, the material will be perceptibly softened. If the amount of nickel is raised to 25%, this softening is even more apparent. Generally, as the amount of nickel increases, the steel softens, and a 25% nickel steel can be worked cold almost as easily as German silver or cupronickel.

The need exists for a replacement alloy material that is less expensive and more durable (among other things) than the cupronickel coin cladding material that is currently in use. As described herein, the inventors determined that, by manipulating various steel alloys, a nickel steel alloy could be identified and developed for use as an alternative coin cladding material for coins such as US dimes, quarters, half dollars, and dollar coins. The material described herein meets that criteria and is compatible with coin validator/acceptor machines currently in use.

SUMMARY OF THE INVENTION

This disclosure is directed to a steel alloy to be potentially used as cladding material for new US coins. The cladding material described herein is an alternative to the existing cupronickel cladding on currently-circulating US coins. In the preferred embodiment, the cladding material described herein comprises 73-77% iron, 22-26% nickel, 0.2-0.5% carbon, and 1-5% manganese. The cladding material has an International Annealed Copper Standard (IACS) conductivity of less than 2%, a relative permeability of approximately 1.0-1.1, and a hardness value of 50-70 HRC 15 T (Rockwell Hardness).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

Figure 1:
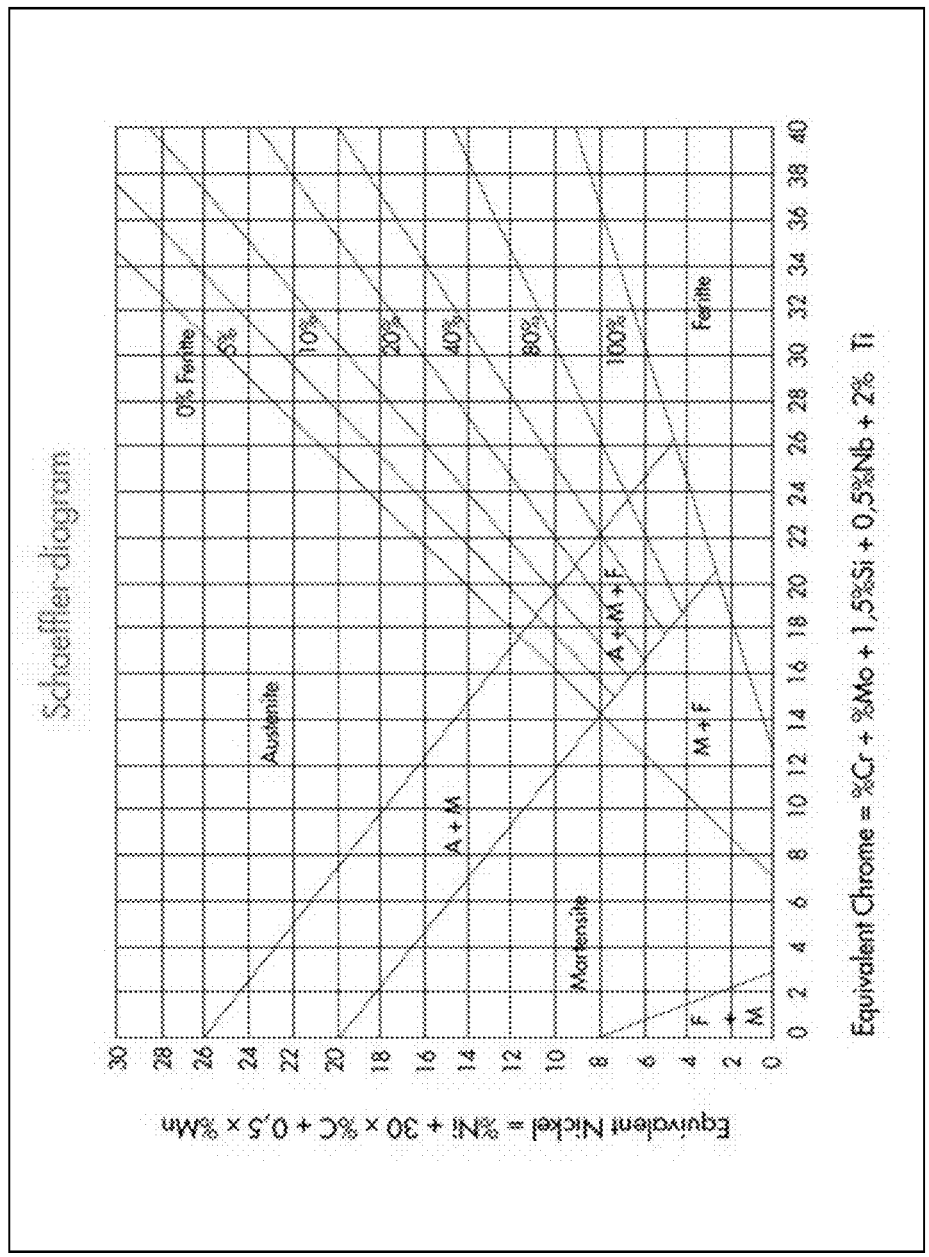
FIG. 1 is a Schaeffler Diagram.

The inventors considered multiple potential materials to arrive at an alloy that has the physical, chemical, and mechanical properties to comprise a new replacement coin cladding. The inventors determined that the amount of nickel in any replacement coin should be significant (approximately 25%), the relative permeability should be near 1.0, and the hardness should be similar to German silver or a cupronickel alloy.

First Sample Set

The inventors melted predetermined amounts of iron, nickel, manganese, and copper together in a crucible to assemble six potential alloys into a first sample set (CB1928-CB1933). The samples had a 3 inch diameter and comprised 0.5 inch buttons. Initially, the carbon concentration was kept low to avoid hardness problems with punching and stamping that result from the use of higher carbon steels. A first batch of samples was tested at National Institute of Standards and Technology (NIST) and the Philadelphia Mint.

The Table 1 samples were tested at NIST using a scanning electron microscope energy dispersive x-ray (EDX) at NIST.

TABLE 1

The composition measured with EDX at NIST

| NIST EDX | Fe | Ni | Mn | C |
|---|---|---|---|---|
| CB1928 | 76.74 | 21.39 | 1.87 | 0 |
| CB1929 | 74.43 | 21.72 | 3.86 | 0 |
| CB1930 | 83.00 | 13.32 | 3.68 | 0 |
| CB1931 | | | | |
| CB1932 | 78.83 | 17.29 | 3.90 | 0 |
| CB1933 | 73.17 | 23.33 | 3.50 | 0 |

The Table 2 samples were tested with a glow discharge-optical emissions spectrometer (GD-OES) at the Philadelphia Mint.

TABLE 2

The composition measure with GD-OES at Philadelphia Mint

| GD-OES | Fe | Ni | Mn | C |
|---|---|---|---|---|
| CB1928 | 79.37 | 19.13 | 1.47 | 0.0041 |
| CB1929 | 77.75 | 19.16 | 3.04 | 0.0052 |
| CB1930 | 84.06 | 13.17 | 2.74 | 0.0024 |
| CB1931 | 85.35 | 12.91 | 4.72 | 0.0065 |
| CB1932 | 79.30 | 15.60 | 4.55 | 0.0067 |
| CB1933 | 75.84 | 21.23 | 2.80 | 0.0162 |

Initial permeability tests used a simple magnetic attraction evaluation. Essentially, if a relatively strong magnet could attract the material, the sample was magnetic and the permeability was significantly higher than 1.0—otherwise the sample was considered to have a low relative permeability or to be non-ferromagnetic An eddy current conductivity meter was the used to measure conductivity more precisely. If the material was ferromagnetic, the meter popped out an error message that indicated that the material was clearly ferromagnetic and a conductivity value could not be obtained. Otherwise the meter screen displayed a digital conductivity value. These measurements/tests were designed to simulate the initial screening process used by coin validators and coinage separation systems intended to detect and reject invalid coins based on eddy current.

For the first batch of 6 samples, only sample CB1933 was non-magnet at room temperature. With reference to Table 1, the non-ferromagnetic property of CB1933 is basically attributable to a high nickel concentration. When the CB1933 sample was stored in a freezer, at about −10° C. for 12 hours, the phase of the sample transferred from face-centered cubic (FCC) to body centered cubic (BCC), and the sample transitioned to magnetic. Particular attention was paid to the amount of carbon in the samples. Based on reports from non-US mints that use (or have used) steel coins, the carbon concentration in the coins was typically lower than 0.01%—primarily because a higher carbon concentration made the material harder and (among other things) more difficult to stamp.

Schaeffler Diagram Analysis

The Schaeffler diagram (shown in FIG. 1) shows that (among other things) carbon affects steel by causing steel to remain in the FCC phase. The Schaeffler diagram shows a very clear boundary of different steel phases/microstructures. In the Schaeffler diagram, there are two equivalent parameters—one is equivalent chrome, the other is equivalent nickel. A "nickel equivalent" is calculated for the austenite-stabilizing elements, and a "chromium equivalent" is calculated for the ferrite-stabilizing elements.

Since chrome causes high strain hardening, and a high nickel content makes steel soft, -chromium, molybdenum and silicon were not used in the sample materials that the inventors assembled to identify a new alloy. Only a nickel equivalent was considered for use in the new alloy. With reference to FIG. 1, when the nickel equivalent value is higher than 26, the steel will be in an austenitic non-ferromagnetic phase. Carbon plays an important role in keeping the steel in the austenite phase. One percent of carbon is equivalent to 30 percent of nickel. Thus, if the carbon is less than 1 percent, the steel will be non-ferromagnetic.

Second Sample Set

Guided by data/information from the first sample set, the inventors assembled a second batch of test samples. The composition of the new samples is shown in Tables 3 and 4.

TABLE 3

GD-OES measurement of CB1940-CB1945

| Metalwerks | Fe | Ni | Mn | C | Cu |
|---|---|---|---|---|---|
| CB1940 | 77.76 | 21.30 | 0.67 | 0.18 | 0.02 |
| CB1941 | 76.00 | 21.67 | 2.10 | 0.15 | 0.01 |
| CB1942 | 75.80 | 21.61 | 2.40 | 0.16 | 0.02 |
| CB1943 | 73.85 | 21.72 | 4.08 | 0.20 | 0.02 |
| CB1944 | 72.10 | 21.09 | 3.59 | 0.24 | 2.91 |
| CB1945 | 77.76 | 21.47 | 0.67 | 0.06 | 0.02 |
| CB1952 | 73.16 | 20.89 | 4.17 | 1.02 | 0.01 |
| CB1957 | 74.92 | 20.61 | 3.91 | 0.49 | 0.01 |

TABLE 4

SEM EDX Spectrum of CB1940-CB1957

| Metalwerks | Fe | Mn | Ni | Cu |
|---|---|---|---|---|
| CB1940 | 74.45 | 1.02 | 24.53 | 0.00 |
| CB1941 | 70.71 | 4.78 | 24.40 | 0.00 |
| CB1942 | 70.55 | 4.83 | 24.62 | 0.00 |
| CB1943 | 69.58 | 5.06 | 24.65 | 0.00 |
| CB1944 | 68.89 | 4.20 | 24.26 | 2.41 |
| CB1945 | 70.42 | 4.77 | 24.3 | 0.00 |
| CB1952 | 70.45 | 4.92 | 24.48 | 0.0 |
| CB1957 | 70.80 | 4.80 | 24.50 | 0.0 |

Based on previous experience, the inventors suspected that the carbon concentration data obtained with the EDX would likely be inaccurate—so the carbon concentration values shown in Table 4 were disregarded. Carbon concentration data measured by GD-OES is (based on empirical data) about 0.1% below the actual value. Consequently, the carbon concentration amount in the test samples is the data shown in Table 3, plus 0.1%. The other element concentrations listed in Table 4 are generally accurate.

The hardness of the test samples is listed in Tables 5 and 6

TABLE 5

Hardness HRC 15T

| sample | Hardness |
|---|---|
| CB1928 | 89.9 |
| CB1929 | 83.9 |
| CB1930 | 91.4 |
| CB1931 | 90.1 |
| CB1932 | 88.4 |
| CB1933 | 78.2 |

TABLE 6

Hardness HRC 15T

| Sample | before annealing | After 1900° F. 40 min air cool | After 1900° F. 40 min quench in water |
|---|---|---|---|
| BC1940 | 72.6 | 76.5 | 77.3 |
| BC1941 | 83.3 | 74.5 | 76.8 |
| BC1942 | 71.7 | 75.6 | 76.3 |
| CB1943 | 74.9 | 78.7 | 77.2 |
| CB1944 | 75.8 | 80.2 | 78.8 |
| CB1945 | 70.5 | 80.9 | 83.0 |

Note that for the tested samples, the hardness did not increase by increasing carbon concentration—most likely because of the high nickel content of the samples. The conductivity of the first batch (CB1928-CB1933) could not be measured due to the high relative permeability of the samples. For second batch (CB1940-CB1945), conductivity was measured on the sample button surface and the conductivity values are listed in Table 7.

TABLE 7

The conductivity of nickel steel.

| Button sample | obverse | reverse |
|---|---|---|
| CB1940 | 1.658 | 1.469 |
| CB1941 | 1.701 | 1.567 |
| CB1942 | 1.692 | 1.552 |
| CB1943 | 1.706 | 1.560 |
| CB1944 | 0.718 | Ferrous |
| CB1945 | Ferrous | Ferrous |

TABLE 8

The conductivity of CB1943 strip

| CB 1943 strip | 60 KHz | 120 KHz | 240 KHz | 480 KHz |
|---|---|---|---|---|
| 1 | 1.263 | 1.687 | 1.966 | 2.01 |
| 2 | 1.264 | 1.656 | 1.962 | 2.007 |
| 3 | 1.264 | 1.678 | 1.981 | 2.02 |
| 4 | 1.227 | 1.647 | 1.961 | 2.005 |
| 5 | 1.373 | 1.702 | 1.992 | 2.031 |
| average | 1.278 | 1.674 | 1.972 | 2.015 |

One sample button (CB1943) was rolled into 0.065" thick and 1" wide strip and then annealed. After annealing, the conductivity was re-measured—and the conductivity value appeared to vary with frequency. The variation likely occurred because the thickness effect was high when the conductivity was low. This sample strip was then punched into monolithic coin blanks. The blanks were upset with the modified upset tooling, and finally stamped into a monolithic 5 cent coins.

Figure 2:
FIG. 2 is a photograph showing an obverse of a coin stamped from sample CB1943 shown in Tables 3 and 4.
Figure 3:
FIG. 3 is a photograph showing the reverse of the coin shown in FIG. 2.
Figure 4:
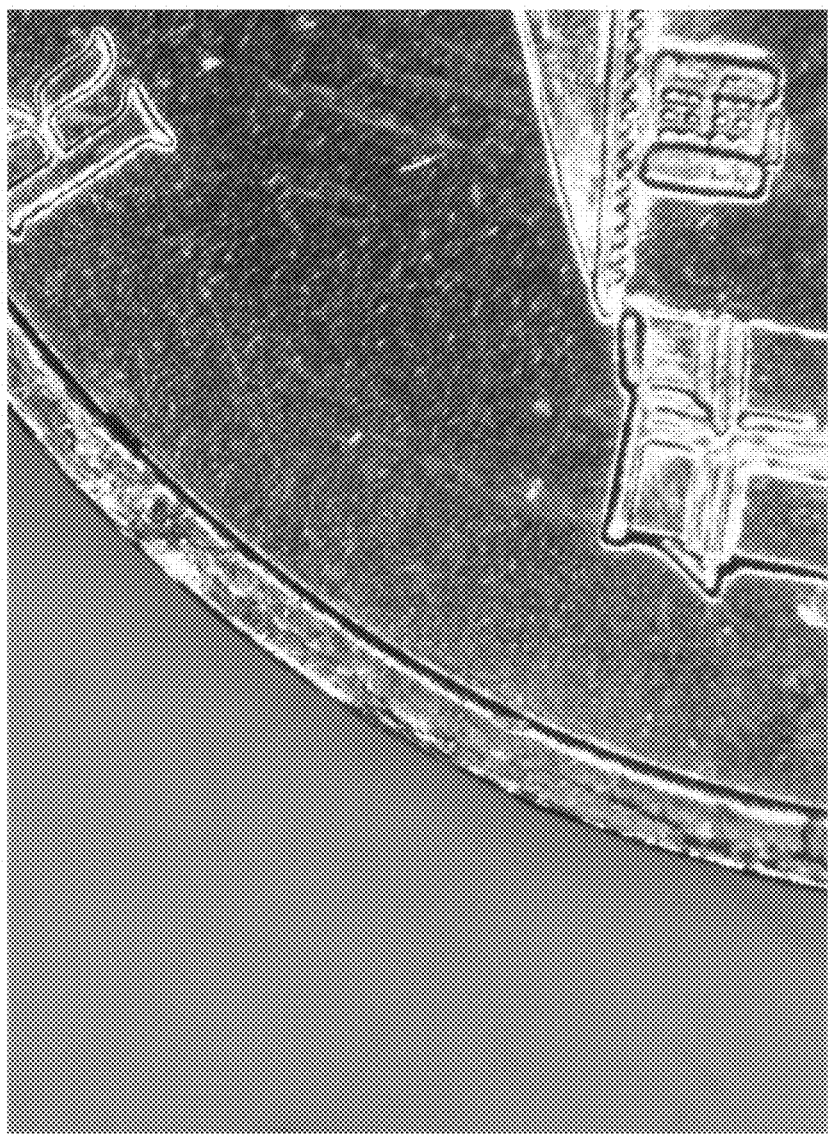
FIG. 4 is a photograph showing an enlargement of the edge of the coin shown in FIGS. 2 and 3. The enlargement shows that the edge material is "ironed down" and has no "orange peels".

A photograph of the obverse and the reverse image of one of the coins is shown in FIGS. 2 and 3, respectively. The CB1943 alloy material is relatively soft and the edge of the stamped coin was ironed down by the die shoulder, as shown in FIG. 4.

Figure 5:
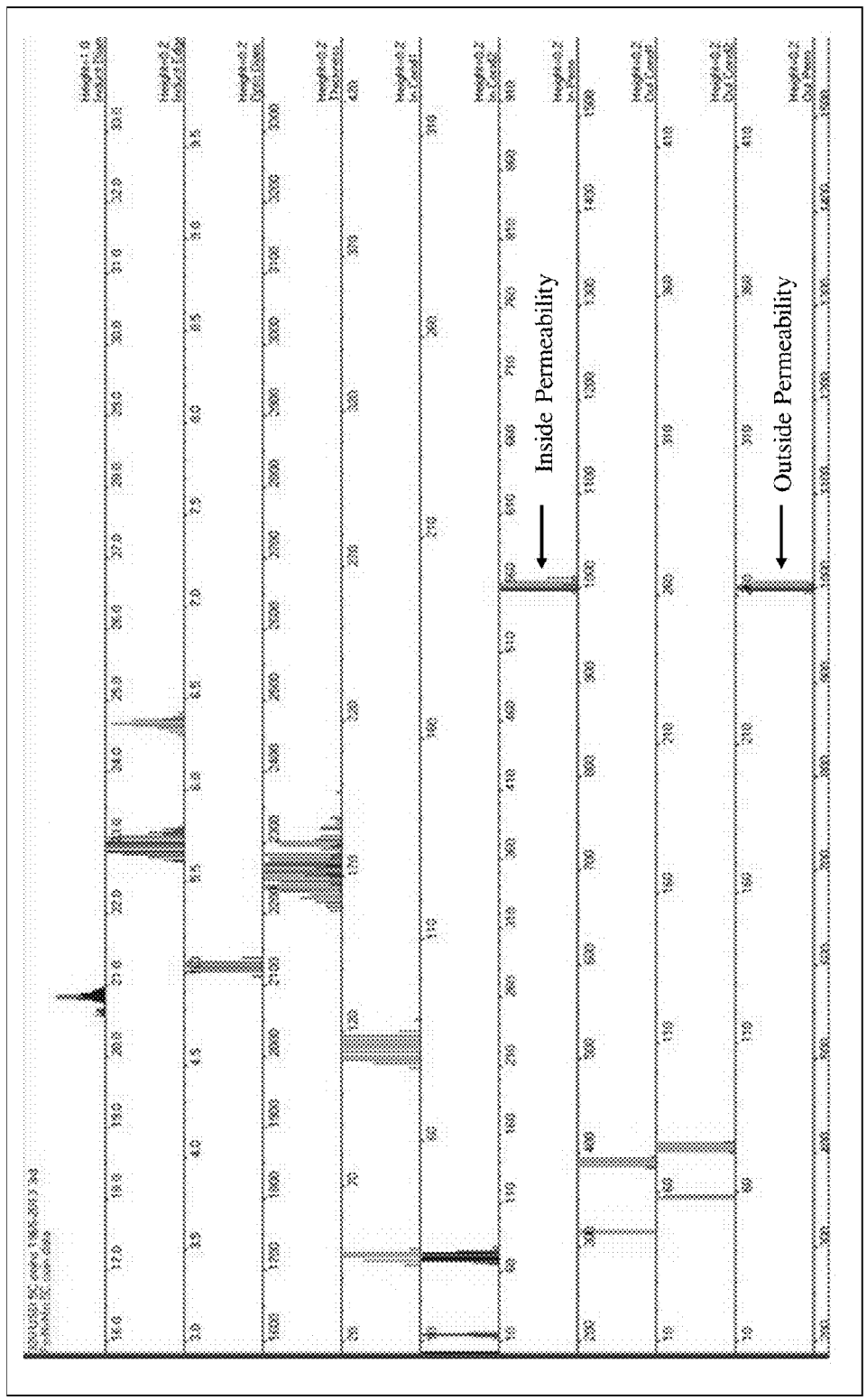
FIG. 5 is a SCAN COIN™ electromagnetic signal (EMS) distribution for a monolithic US 5 cent coin comprised of the CB1943 new alloy sample, as compared to a composite sample of 320 current US five cent coins.

FIG. 5 shows a SCANCOIN EMS distribution for the sample CB1943 monolithic 5 cent coins—as compared to an EMS distribution for a composite of 320 currently circulating 5 cent coins. In the FIG. 5 EMS spectrum, the inside and outside permeability readings of the coins match a current composite EMS of 5 cent circulating coins at around 1000. The values indicate that the new coin material is non-magnetic.

Figure 6:
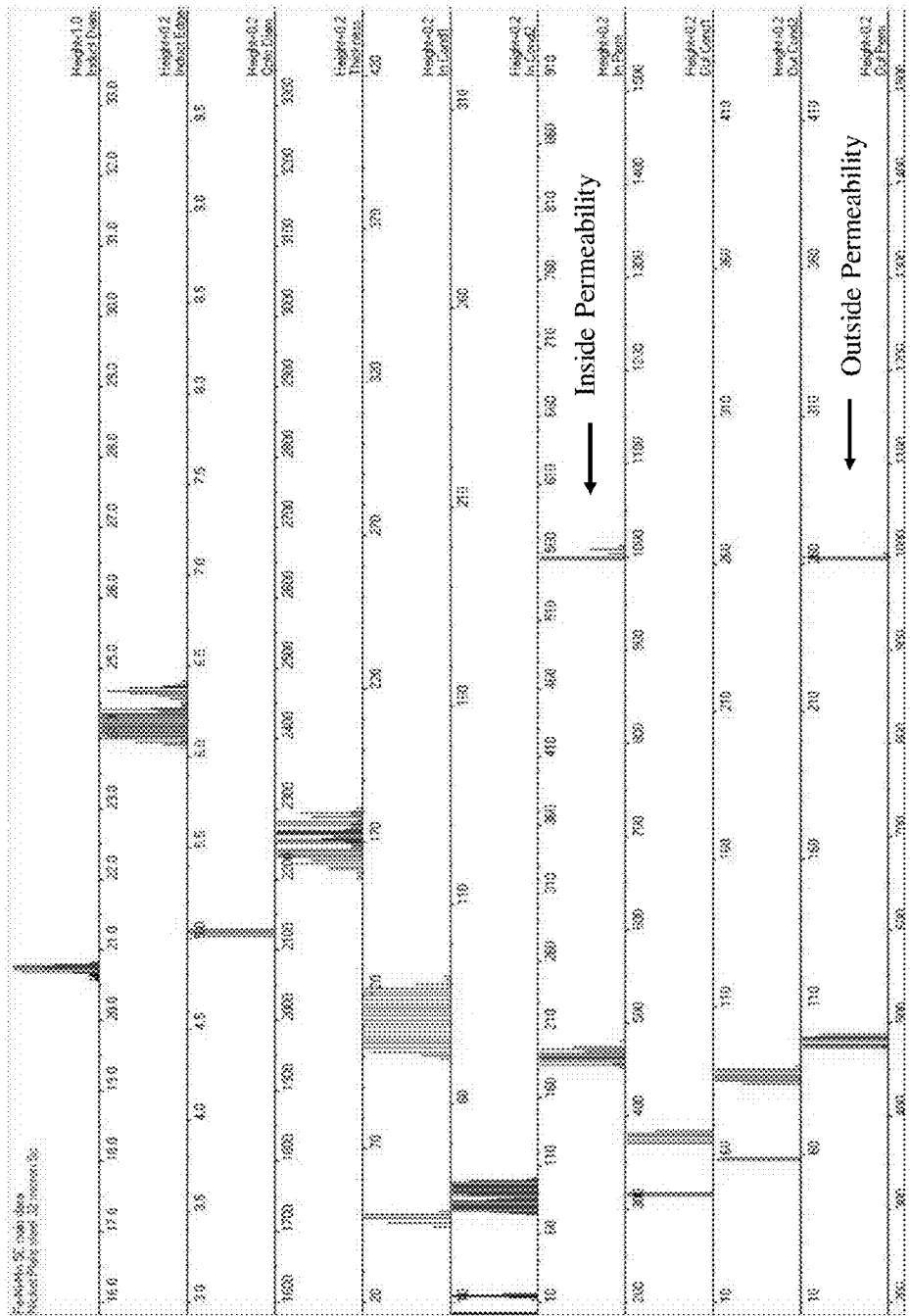
FIG. 6 is a SCAN COIN EMS distribution for a US 5 cent coin comprised of the CB1943 new alloy sample, versus a five cent nickel-plated steel planchet made by the Royal Mint.

FIG. 6 shows a SCANCOIN EMS distribution for the sample CB1943 5 cent coins—as compared to an EMS distribution for Royal Mint nickel-plated steel planchets. For normal steel coins, the measured outside and inside permeability reading are less than 500 in the SCANCOIN distribution spectrum, since the magnetic flux is absorbed in the steel. For the CB1943 steel, the permeability reading is near 1000—which is similar to cupronickel. The CB1943 reading is high because the magnetic flux passes through the metal and reaches the Hall sensor. The conductivity of normal steel is about 2.0 to 3.0% IACS. However, when conductivity is measured by an eddy current sensor, the lag phase angle is completely different from non-magnetic material—therefore, the conductivity readings for the Royal Mint nickel-plated steel planchets are separated from that of CB1943 US five cent coins.

Alloy Color

Figure 7:
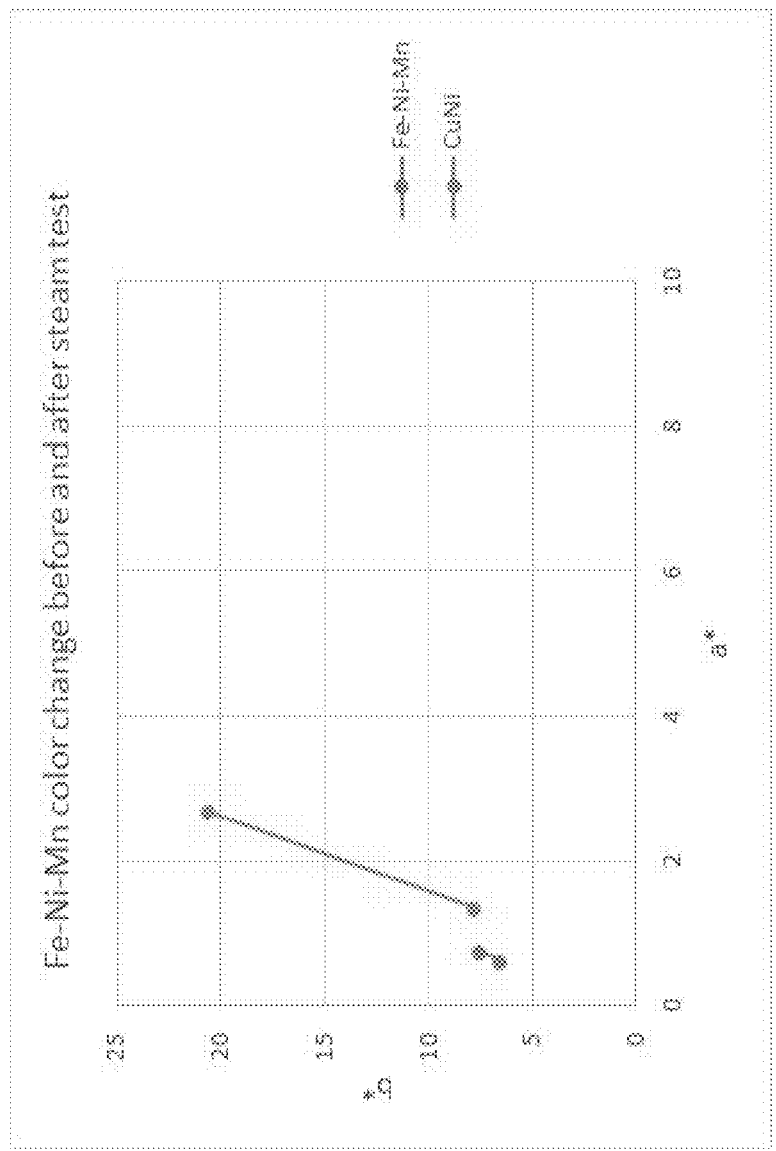
FIG. 7 is a graph showing the color change of a coin clad in the selected alloy before and after a steam test.

The typical color of iron-nickel-manganese steel (such as the current samples) is generally white (i.e. a metallic "silver" color). Since there is a high concentration of nickel in the samples, the corrosion resistance of the samples is much better than cupronickel. The color change before and after a 2 hour steam test is shown in FIG. 7. In FIG. 7, the sample alloy is compared with cupronickel. Relative to the changes observed for cupronickel, the color of the sample alloy remains generally constant.

Initial Test Results

As discussed above, samples CB1928-CB1932 are magnetic and consequently are not a good candidate for use as an alloy for an alternate coinage material. Sample CB1933 is non-magnetic, but the transitions to magnetic at about −10° C., and remains magnetic at room temperature.

For sample CB1944, a small quantity of copper in the alloy causes the CB1944 sample to have some magnetic properties at room temperature. For sample CB1945, due to the low carbon and low manganese content, at room temperature, CB1945 is also magnetic. For sample CB1940, the sample is non-magnetic at room temperature, but transits to magnetic at −20° C. and remains magnetic at room temperatures.

Samples CB1941, CB1942, CB1943, CB1952, and CB1957 were non-magnetic. Even after being buried in the dry ice for one hour at −78° C., the samples did not transit to a magnetic state. Consequently, the inventors found that, if the carbon concentration is higher than 0.25%, the Manganese is higher than 4% and the nickel is about 24-25%, the resulting alloy is non-magnetic and will not transit to a magnetic phase—even at −78° C. Thus, these "new selected Fe—Ni—Mn alloys" (i.e. CB1941, CB1942, CB1943, CB1952, and CB1957) can be used as alternative circulating coinage material. However, although the selected alloys have several desirable characteristics, the EMS distribution is very close to stainless steel and is likely to be rejected by electronic coin recognition systems if the coins are made solely (monolithically) of the selected alloys.

Selected Alloy Cladding (Fe—Ni—Mn/Cu/Fe—Ni—Mn)

One way to modify the EMS of the selected alloys is to use the new alloys as a cladding material—in combination with a copper core (or some other alternative core). By varying the thickness of the of copper core and the alloy cladding, the EMS properties of a composite coin can be manipulated to have essentially the same EMS as currently circulating cupronickel clad coins such as a US dime, quarter, half dollar, and dollar. Currently circulating coins generally have cupronickel cladding and a copper core. If the new alloy-clad coins have the same EMS distribution as the old cupronickel-clad coins, coin validators will accept the new coins and will continue to accept the old coins as well.

Eddy Current Analysis

To explain why/how cladding materials with different conductivities can have the same EMS distribution, basic eddy current theory will be briefly discussed.

When a coin passes in front of an eddy current sensor, based on the conductivity of the coin, the electromotive force and the electrical current in the coin will affect the impedance of the eddy current circuit. The coin validator digitally measures the impedance in the eddy current circuit to obtain an EMS distribution. This signal distribution is used to separate the coins from slugs.

Normally, a coin validator has two reference frequencies for evaluating coins. For a monolithic coin, the EMS measurements at the two reference frequencies yield essentially the same value. However, for a cladded coin (such as US quarter), the EMS at each of the reference frequencies is different. These measurements can be explained in the equations below.

The eddy current density, $J_x$, decreases with the depth;

$$J_x = J_o \exp(-x\sqrt{\pi f \mu \sigma}) \quad (1)$$

where, $J_o$ is the eddy current density at the top surface, when x=0.

f is the frequency;

μ is the permeability of the metal, for non-ferrous material, it is a constant; and, σ is the conductivity of the metal.

The eddy current density changes with f and σ. The total eddy current generated in the metal substrate is an integration of the current density along the depth:

$$I_e = \int_0^x J_o \exp(-x\sqrt{\pi f \mu \sigma}) R dx \quad (2)$$

where R is constant.

δ is defined as the standard penetration depth:

$$\delta = \frac{1}{\sqrt{\pi f \mu \sigma}} \quad (3)$$

n is the number of the standard penetration depth when the depth equal to x.

$$n = \frac{x}{\delta}. \quad (4)$$

The eddy current in the substrate then, is a function of the number of standard penetration depth:

$$I_e = \int_0^{n\delta} J_o e^{\frac{-x}{\delta}} R \delta d\left(\frac{x}{\delta}\right) = J_o \delta R \int_0^{n\delta} e^{\frac{-x}{\delta}} d\left(\frac{x}{\delta}\right) = J_o R \delta e^{\frac{-x}{\delta}}. \quad (5)$$

Normally, when number of standard penetration depth is larger than 3 mm, the eddy current density closes to zero.

When the conductivity (1/resistivity) of a metal is measured by an eddy current sensor, the lag angle, θ, between current and voltage must be considered, since the eddy current is a vector. By multiplying cos (θ), the eddy current vector is projected on the resistance direction. The lag angle θ is also a function of the depth:

$$\theta = \frac{x}{\delta}$$

The projected eddy current density in the resistance of the metal must be multiplied by cos (θ), thus the eddy current projected on the resistance, $I_{e-r}$, is modified and integrated as:

$$I_{e-r} = \int_0^x J_o e^{\frac{-x}{\delta}} \cos\left(\frac{x}{\delta}\right) R dx = J_o R \delta \int_0^{n\delta} e^{\frac{-x}{\delta}} \cos\left(\frac{x}{\delta}\right) d\left(\frac{x}{\delta}\right) \quad (7)$$

$$= \frac{1}{2} J_o R \delta e^{\frac{-x}{\delta}} \left(\sin\frac{x}{\delta} - \cos\frac{x}{\delta}\right)\Big|_0^{n\delta}$$

$$= \frac{1}{2} J_o R \delta (e^{-n}(\sin(n) - \cos(n)) - e^0(\sin(0) - con(0)))$$

$$= \frac{1}{2} J_o R \delta (e^{-n}(\sin(n) - \cos(n)) + 1)$$

Figure 8:
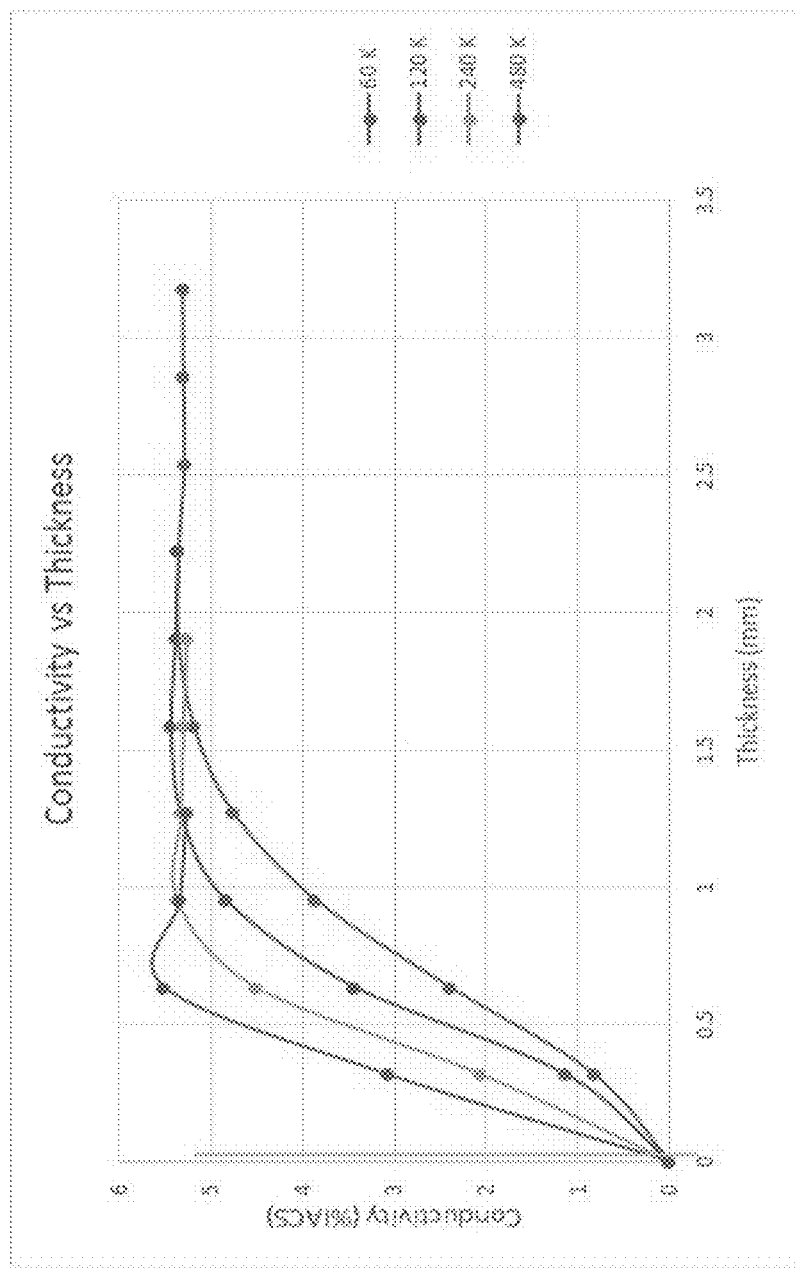
FIG. 8 is a graph showing measured conductivity as a function of thickness for a non-magnetic alloy.
Figure 9:
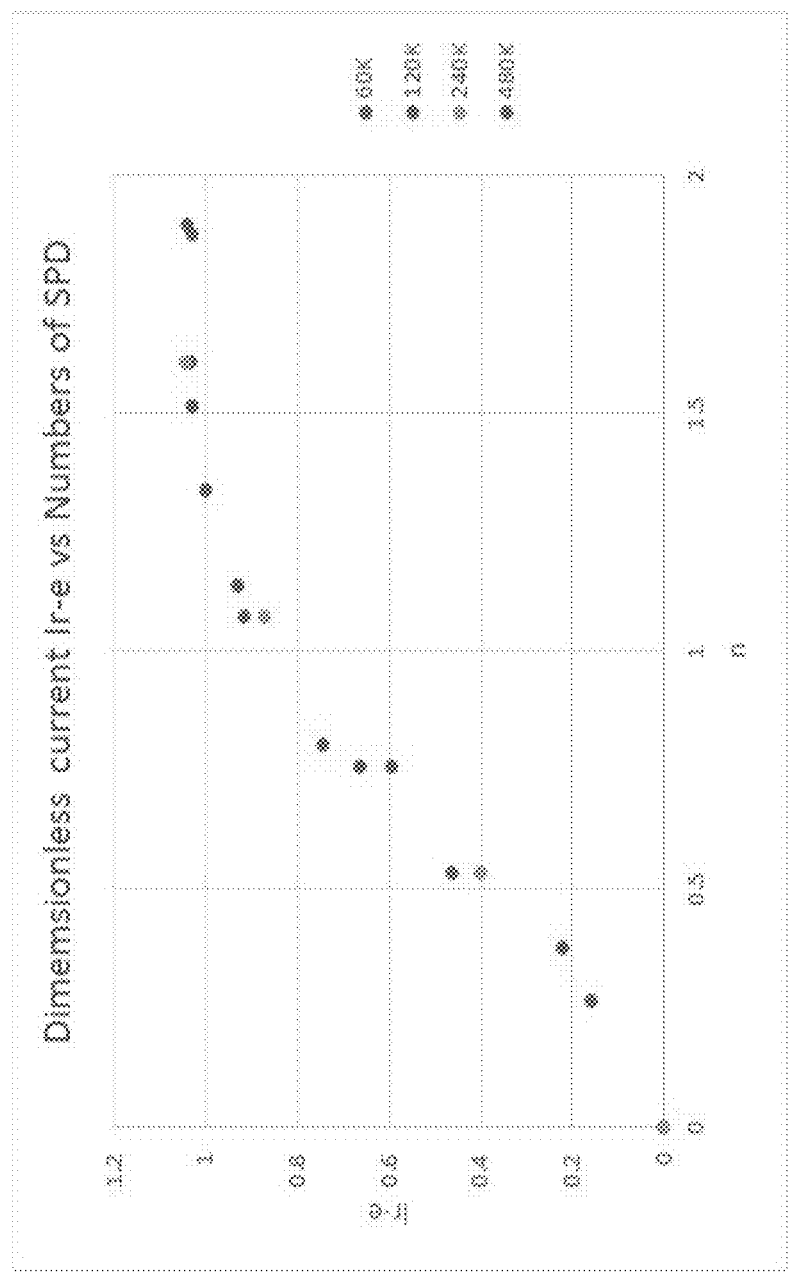
FIG. 9 is a graph showing the eddy current Ir-e change with n, at 60, 120, 240, and 480 KHz.

For example, FIG. 8 shows a graphical representation of sample conductivity versus thickness at selected frequencies. Specifically, FIG. 8 shows data at 60, 120, 240 and 480 KHz frequency. Referring to equation (2) above, if the thickness x in equation (2) is replaced by number of the standard penetration depth (in mm), the measured eddy currents at different frequencies becomes the same as shown in FIG. 9.

This example illustrates that once the number of standard penetration depth (SPD), n, is used, the total eddy current generated in the metal is the only function of n. Thus, the eddy current in a cladded coin can be integrated by the two metal zones. The first zone is from 0 to $n_1$, and second zone is from $n_1$ to $n_2$.

For the cladded metal coin, the conductivity measurement by an eddy current sensor is the sum of two layers of the substrate. Since the thickness of the cladded layer normally is thinner than 1.0 mm of penetration depth. The total eddy current equals to sum of two eddy currents generated in the two layers.

Equation 7 is further written as:

$$I_{e-r} = \int_0^{x_1} J_{o1}\exp\left(-\frac{x}{\delta_1}\right)\cos\left(\frac{x}{\delta_1}\right)R_1 dx + \quad (8)$$

$$\int_{x_1}^{x_2} J_{o2}\exp\left(-\frac{x}{\delta_2}\right)\cos\left(\frac{x}{\delta_2}\right)R_2 dx$$

$$= J_{o1}R_1\delta_1 \int_0^{n_1\delta_1} \exp\left(-\frac{x}{\delta_1}\right)\cos\left(\frac{x}{\delta_1}\right)d\left(\frac{x}{\delta_1}\right) +$$

$$J_{o2}R_2\delta_2 \int_{n'_1\delta_2}^{n_2\delta_2} \exp\left(-\frac{x}{\delta_2}\right)\cos\left(\frac{x}{\delta_2}\right)d\left(\frac{x}{\delta_2}\right)$$

$$= \frac{1}{2}J_{o1}R_1\delta_1(\exp(-n_1)(\sin(n_1) - \cos(n_1)) -$$

$$\exp(0)(\sin(0) - con(0))) + \frac{1}{2}J_{o2}R_2\delta_2(\exp(-n_2)(\sin(n_2) -$$

$$(\sin(n_2) - \cos(n_2)) - \exp(n'_1)(\sin(n'_1) - con(n'_1)))$$

where $$n'_1 = \frac{\delta_1}{\delta_2}n_1.$$

Figure 10:
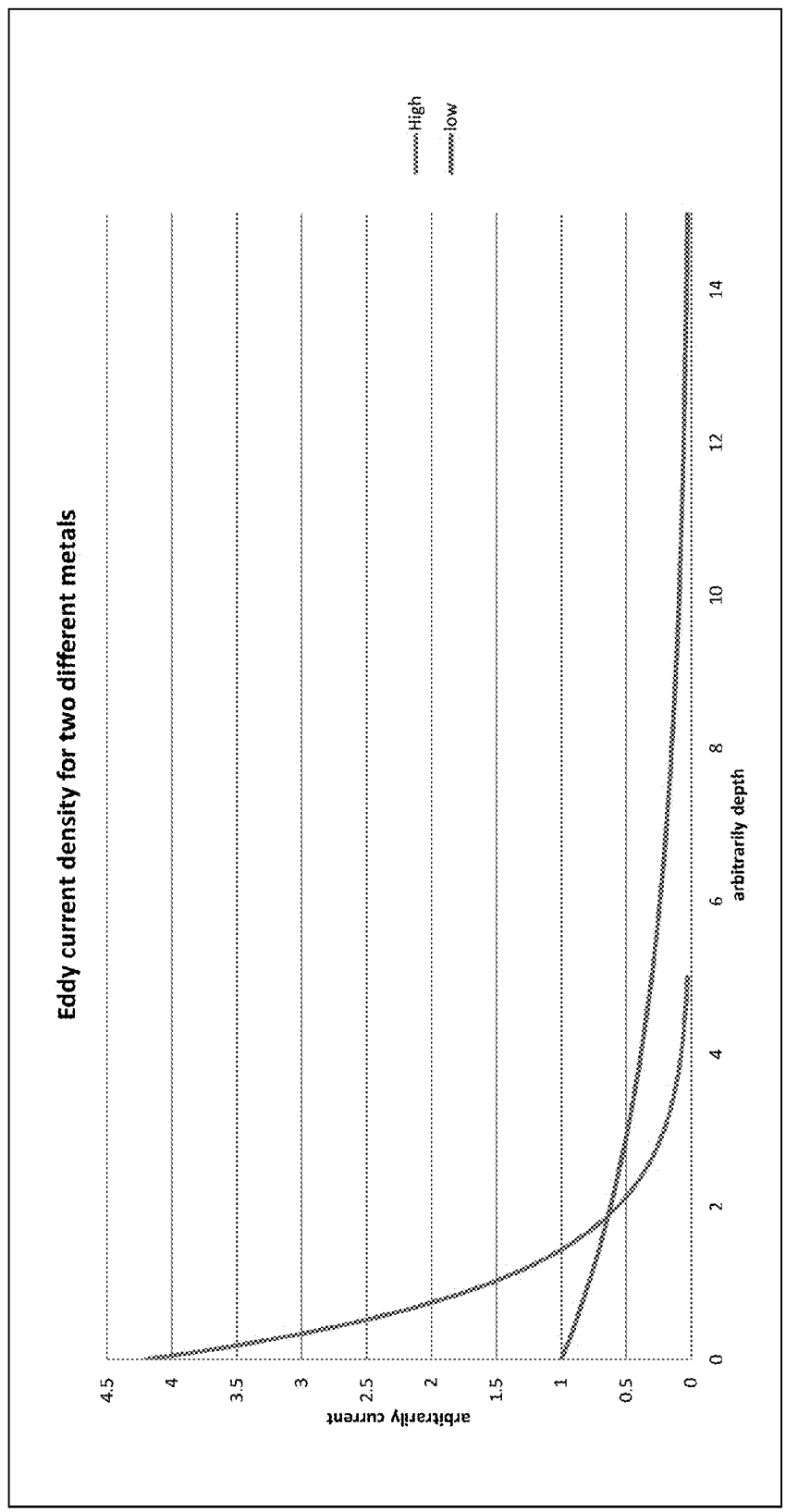
FIG. 10 is a graph showing how eddy current density varies with depth for both high and low conductivity metals.

$J_{o1}$ and $J_{o2}$ are the eddy current density when thickness equals to zero;

$\delta_1$ and $\delta_2$ are also different due to the different conductivity (as shown in FIG. 10)

The blue line in FIG. 10 is the eddy current density for a high conductivity metal (such as copper), which has a shallower penetration depth. The red line is the current density for a low conductivity material (such as cupronickel), which has a deeper penetration depth. Assuming that the cladded top layer thickness has a 0.5 mm arbitrarily depth, the total eddy current in the substrate is equal to the integration of the area under the red line from 0 to $n_1$ plus the integration of the area under the blue line from $n_1$ to $n_2$.

Based on this eddy current measurement process, if a non-ferromagnetic metal is used to replace cupronickel as the top layer cladded sheet, its conductivity can be the same as cupronickel. Although the eddy current density curve will change due to the new material, the total integration area under the curve can be kept constant by changing the depth. Consequently the sum of the measured eddy current will also remain constant.

Figure 11:
FIG. 11 is a photograph showing a random collection of coins that are clad in the new alloy and that have a copper core.

According to the equation discussed above, 10 kg of the selected (Fe—Ni—Mn) austenitic steel alloy was melted and used as cladding material for a copper core to make new quarter coins. The stamped "non-sense" quarter coins are shown in FIG. 11. The targeted thickness of the cladded layers are: 0.011/0.034/0.011 inches. (Current quarter is 0.009/0.0365/0.009 inches). The hardness of the cladded material is listed in Table 9.

The hardness of the new quarters after annealing is the same as current cupronickel quarters. The coins were annealed at 750° C. for 40 minutes, and then quenched in oil. (Since the annealing furnace only has an oil quench—note that water is also an acceptable quench medium).

TABLE 9

New Alloy Cladding (Fe—Ni—Mn/Cu/Fe—Ni—Mn) Clad Hardness with HRC15T Indenter.

| Before annealing | After 800° C. 30 min air cool quenched in oil |
|---|---|
| 76.63 | 55.72 |

Figure 12:
FIG. 12 is a photograph showing the obverse of a new "non-sense" quarter.
Figure 13:
FIG. 13 is a photograph showing the reverse of the new "non-sense" quarter.

The appearance of the new coins is essentially the same as the currently circulating coins. FIG. 11 shows a random scattering of coins clad in the selected alloy and having a copper core. The obverse and reverse of the coins are shown in FIGS. 12 and 13 respectively. Under a 64 ton load, the new coins filled the stamping die well—with a clean relief and no orange peel on the coin edge. In an informal field test, the coins were dropped into a coin validator and were readily accepted.

Figure 14:
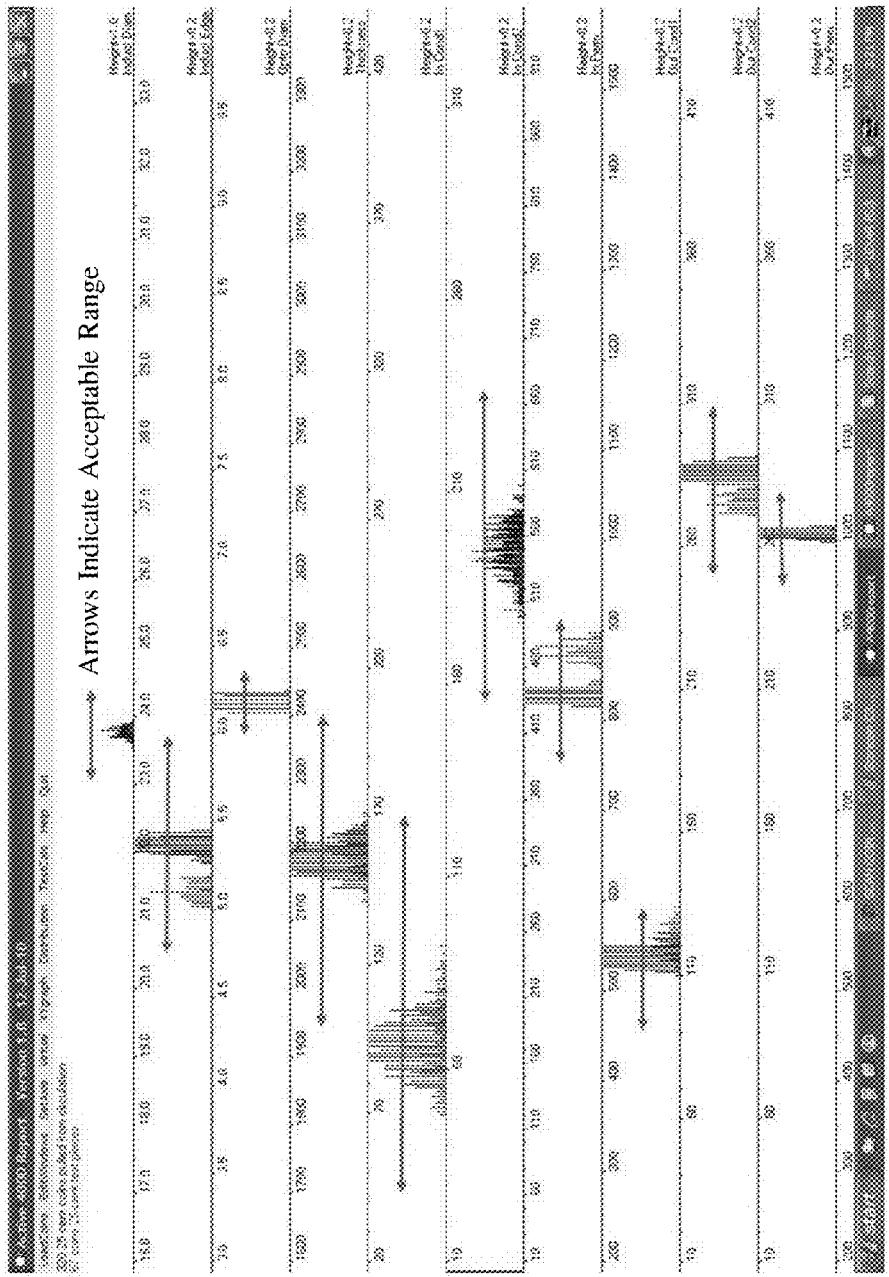
FIG. 14 is a SCAN COIN EMS distribution for the new quarter compared with a composite EMS representing 320 circulating quarters.

The SCAN COIN EMS spectrum is shown in FIG. 14 and, for the purposes of this disclosure, defines acceptable EMS distribution ranges for a properly calibrated coin validator machine. In each EMS channel, the new coin EMS distribution signal is within the "acceptable range" of a properly calibrated coin validator machine. However, compared to a composite measurement of 320 currently circulating coins, at two channels (outside conductivity and outside permeability), the EMS spectrum of the new coins does not exactly coincide with the currently circulating coins. This deviation is not caused by the non-magnetic properties of the new alloy, but is due to the thinner copper core detected by the Hall sensor.

The target composition of the new alloy is about Ni 24.75%, Mn 5%, carbon 0.5%, Fe balance. The composition as measured by the GD-OES, is shown in the Table 10.

TABLE 10

The Composition Measured by GD-OES for the Cladded Sheet.

| Element | Result | RSD | Measure |
|---|---|---|---|
| Fe | 73.047 | 0.11 | 73.047 |
| C | 0.2886 | 0.54 | 0.2886 |
| Si | 136 PPM | 7.8 | 136 PPM |
| Mn | 4.243 | 0.67 | [4.243] |
| Ni | 22.331 | 0.14 | [22.331] |
| Cr | 15.19 PPM | 4.6 | [15.19 PPM] |
| Cu | 82.1 PPM | 1.9 | 82.1 PPM |
| Ti | 0 | 0.8 | <DL |
| V | 0 | 0.8 | <DL |
| Al | 0.02583 | 1.4 | 0.02583 |
| Mo | 0 | 0.8 | <DL |
| N | 0.0414 | 2.5 | [0.0414] |
| W | 0 | 0.8 | <DL |

The conductivity of the planchets and the coins made with the new cladding material is listed in Table 11.

TABLE 11

The Conductivity of Planchets and Coins Comprising the New Alloy Cladding with a Copper Core (Fe—Ni—Mn/Cu/Fe—Ni—Mn)

|  | 60 KHz | 120 KHz | 240 KHz | 480 KHz |
|---|---|---|---|---|
| Coins conductivity | 83.14 | 68.94 | 45.73 | 22.33 |
| Coin standard deviation | 1.64 | 2.17 | 2.34 | 2.05 |
| Planchets conductivity | 81.98 | 66.67 | 43.09 | 20.20 |

TABLE 11-continued

The Conductivity of Planchets and Coins Comprising
the New Alloy Cladding with a Copper Core
(Fe—Ni—Mn/Cu/Fe—Ni—Mn)

|  | 60 KHz | 120 KHz | 240 KHz | 480 KHz |
|---|---|---|---|---|
| Planchet standard deviation | 0.94 | 1.38 | 1.51 | 0.63 |
| 320 circ coins conductivity | 82.28 | 66.40 | 43.68 | 23.06 |
| 320 circ coins standard deviation | 2.05 | 2.60 | 2.65 | 1.97 |

Figure 15:
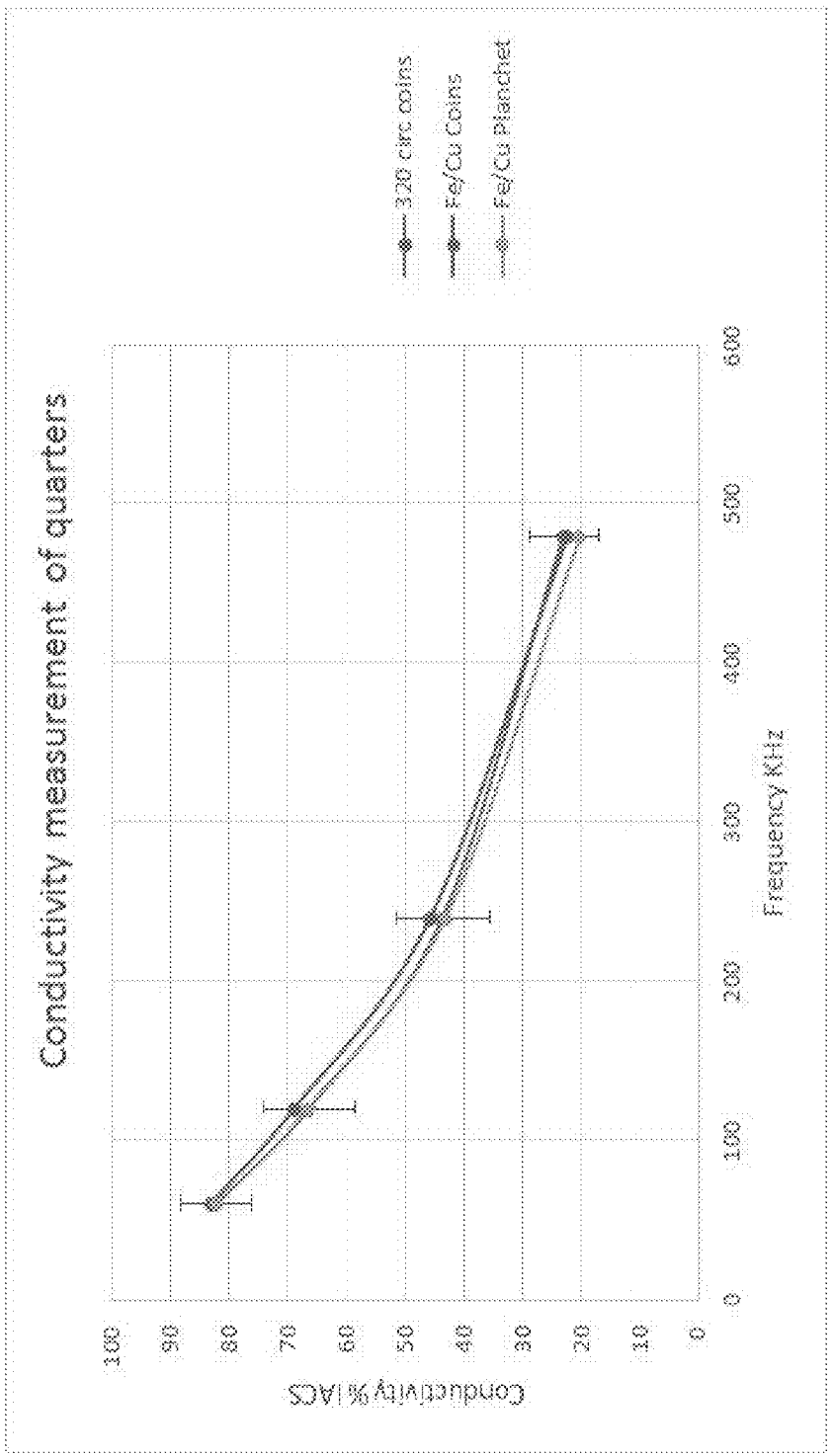
FIG. 15 is a graph showing conductivity curves representing coins and planchets made of new cladded material at multiple frequencies, versus a conductivity curve representing a composite of 320 circulating coins at the same frequencies (i.e. 60, 120, 240, and 480 KHz frequencies).

FIG. 15 shows the combined conductivity of the new cladded coin and planchets at four different frequencies (60, 120, 240, and 480 KHz). For comparison, the composite conductivity of 320 circulating coins is plotted in the same chart. The error bar in the chart shows an error range of three standard deviations based on the 320 circulating coin composite curve. As shown in FIG. 15, the conductivity of both the new coins and planchets is well within the three standard deviation error range generally acceptable to a coin validator machine, so that these coins clearly fall within the "acceptable range".

Coin Security

In an effort to reduce costs, many countries choose to use nickel or cupronickel plated steel as coinage material. However, although plating has successfully decreased costs, the security of the coins is also decreased. As shown in the eddy current analysis above, the total eddy current generated in the measured metal substrates equals the sum of those substrate currents. A structure comprising multiple plated layers can be replaced by a single metal layer structure. Consequently, simple materials like aluminum foil can sometimes be used to imitate plating materials and thereby fool coin validators.

Normally, the plating layer thickness of most plated coins is around 20 μm to 30 μm (around 0.001 inches). In this thickness range, the conductivities measured at high and low frequencies may be the same. The relationship between thickness and conductivity is shown in FIG. 8. Sheets of cupronickel were rolled down to strips of different thicknesses, and the conductivities at each thickness were measured at four frequencies and plotted in FIG. 8. When the thickness equals 0.32 mm, the highest conductivity measured at 480 KHz is about 3.1% IACS. The lowest conductivity measured at 60 KHz is only 0.8% IACS.

Most coin validators have two reference frequencies. At the highest frequency, the conductivity of a plated coin can sometimes be matched by adding a layer of aluminum foil to a slug, and then adjusting the thickness of the foil layer to match the coin conductivity. However, at the second (lower) reference frequency, the measured conductivity exhibited by the coin should be different from the first. With this technique/process, a multi-layer structured coin is theoretically secured from fraudulent reproduction.

However, when the thickness of the coin's outer layer is in the plating range, (0.001 inches), the measured conductivity variation at different frequencies is often smaller than (i.e. within) the margin of error for low-cost eddy current sensors. By contrast, when the coin is clad rather than plated, the outer layer is thicker, so that the first reference frequency more clearly measures the conductivity in the cladding, and the second reference frequency measures the conductivity in the (for example, copper) core—which comprises a significantly different material than the cladding.

For (at least) these reasons, cladded coins are much more secure than plated coins. When the cladded top layer thickness is around 0.5 to 1.0 mm standard penetration depth, the conductivities measured at different frequencies are very different. For example, for the new alloy, when the cladded layer is 0.0125, 0.0145 and 0.017 inches thick, the conductivities (with a copper core) at different frequencies are listed in Table 12.

TABLE 12

Conductivities for New Alloy Clad Coins With a Copper Core (Fe/Ni—Mn/Cu/Fe—Ni—Mn)

| | Frequency | | | |
|---|---|---|---|---|
| | 60 KHz | 120 KHz | 240 KHz | 480 KHz |
| Conductivity (% IACS) 0.0125" cladded | 68.0 | 46.8 | 24.3 | 11.4 |
| Conductivity (% IACS) at 0.0145" cladded | 59.6 | 37.5 | 19.1 | 8.7 |
| Conductivity (% IACS) at 0.0170" cladded | 44.0 | 23.1 | 10.6 | 5.7 |

If the dimensions of the new coin are 0.017/0.030/0.017 inches for a coin comprising a Fe—Ni—Mn/Cu/Fe—Ni—Mn cladded sheet, no other metal or alloy cladded sheets can have a similar conductivity at 60, 120, 240, and 480 KHz—except stainless steel. However, due to the high strain hardening properties, stainless steel cladded sheet cannot be stamped using conventional equipment. If a normal carbon steel is used for cladding, the cladded material is magnetic, and the lag angle shift is totally different from non-magnetic metal. Therefore, currently, the EMS generated by the new alloy Fe—Ni—Mn/Cu/Fe—Ni—Mn cladded sheet is unique and therefore secure.

CONCLUSION

The Fe—Ni—Mn alloy is non-magnetic, has a low hardness value, and is a low strain hardening material—which is relatively easily stamped. The corrosion resistance and durability of the new alloy is better than cupronickel so that the new alloy has a longer wear life. The total cost for the new alloy material may be lower than the nickel plated steel, multiple layer plated steel, or nickel plated zinc. Unfortunately, the conductivity of the new alloy is less than 2.0% IACS—therefore, it cannot be used as a seamless replacement metal for monolithic coins such as US 5 cent coins.

However, the new alloy can be used as cladding material (in combination with a copper core) to replace cupronickel cladded coins (which also have a copper core). The EMS distribution of the new coins is within the "acceptable" range—as read by the eddy current sensors in a properly calibrated coin validator system. The new alloy coin can be used as a cladding material with current US cladded coins such as dime, quarter, half dollar and dollar coins. The new coins also have enhanced wear and corrosion resistance properties. If the new alloy coins are adopted, the potential raw material cost saving is around 15% to 18%.

Coins stamped from the new alloy are secure from fraudulent reproduction and electronic imitation. No other metal or alloy cladded sheets has a similar conductivity at 60, 120, 240, and 480 KHz—except stainless steel. However, due to the high strain hardening properties, stainless steel cladded sheets cannot be stamped using conventional equipment—therefore fraudulent reproduction of the coins is not practical. Coin security will remain high even if the thickness of the copper core may be further reduced to 0.010 inch to 0.020 inches—which can further reduce costs.

If the US elects to manufacture a 2 dollar coins, the new alloy discussed in this disclosure will be the least expensive, and most durable and secure material selection currently available.

For the foregoing reasons, it is clear that the method and apparatus described herein provides an alternative coinage material. The material described herein may be modified in multiple ways. The disclosed material may be modified and customized as required by a specific operation or application, and some components may be modified and defined, as required, to achieve the desired result. Such variations are not to be regarded as a departure from the spirit and scope of this disclosure, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

What is claimed is:

1. A cladding material for coins, the cladding material comprising:
   73-77% iron;
   22-26% nickel;
   0.2-0.5% carbon; and,
   1-5% manganese;
   wherein the cladding material comprises at least outer layers of a coin.

2. The alloy of claim 1 wherein the alloy has an International Annealed Copper Standard (IACS) conductivity of less than 2%.

3. The cladding material of claim 1 wherein the permeability is 1.0-1.1.

4. The cladding material of claim 1 wherein the alloy has a hardness value of 50-80 HRC 15 T (Rockwell Hardness).

5. The cladding material of claim 1 wherein the alloy can be cooled to −78° C. for at least 10 minutes with no measurable change in magnetism.

6. A coin comprised completely of the cladding material of claim 1 so that the cladding material of claim 1 comprises a monolithic coin.

7. The cladding material of claim 1 wherein the cladding material of claim 1 sandwiches a metallic center core between two layers of cladding to create a coin.

8. The cladding material of claim 1 wherein the cladding material of claim 1 sandwiches a copper center core between two layers of cladding to create a coin.

9. The coin of claim 8 wherein the coin is structured so that an EMS distribution for the coin is within an "acceptable range"—as read by an eddy current sensor in a properly calibrated coin validator machine, so that the coin is selectively structured to comprise an acceptable planchet for a currently circulating US dime, quarter, half dollar, or dollar coin.

10. The cladding material of claim 7 wherein the cladding material has a hardness so that a coin stamp is filled by stamping with a load of 70 tons or less.

11. The cladding material of claim 8 wherein the cladding material has a thickness of 0.015-0.020 inch.

12. The cladding material of claim 8 wherein the center core has a thickness of 0.010-0.032 inch.

13. The cladding material of claim 8 wherein the cladding material has a greater corrosion resistance and greater durability than cupronickel cladding material when the cupronickel cladding is used on a similarly structured coin.

14. A method for making a steel alloy clad coin, the method comprising the steps of:
   (a) assembling a steel alloy comprising 73-77% iron, 22-26% nickel, 0.2-0.5% carbon, and 1-5% manganese;
   (b) cladding a copper core with the steel alloy by sandwiching a copper core between two layers of the steel alloy to create a steel alloy clad coin.

15. The method of claim 14 wherein the method further comprises:
   (c) annealing the steel alloy clad coin by heating at 800° C. for 30 minutes and quenching in oil or water.

16. The method of claim 15 wherein after step (c), the coin has a Rockwell HRC 15 T hardness of 50-70.

17. The method of claim 14 wherein, in step (a), the steel alloy has an IACS conductivity of less than 2%.

18. The method of claim 14, wherein, in step (a), the steel alloy has a relative permeability of 1.0-1.1.

19. A coin made by the method described in claim 15 wherein the coin is structured so that an EMS distribution for the coin is within an "acceptable range"—as read by an eddy current sensor in a properly calibrated coin validator machine, so that the coin is selectively structured to comprise an acceptable planchet for a currently circulating US dime, quarter, half dollar, or dollar coin.

* * * * *